(12) United States Patent
Omi

(10) Patent No.: US 6,410,911 B1
(45) Date of Patent: Jun. 25, 2002

(54) OPTICAL DISPLACEMENT DETECTING APPARATUS

(75) Inventor: Toshihiro Omi, Kanagawa (JP)

(73) Assignee: Mitutoyo Corporation, Kawasaki (JP)

(*) Notice: Subject to any disclaimer, the term of this patent is extended or adjusted under 35 U.S.C. 154(b) by 0 days.

(21) Appl. No.: 09/549,616

(22) Filed: Apr. 14, 2000

(30) Foreign Application Priority Data

May 12, 1999 (JP) .......................................... 11-131999

(51) Int. Cl.[7] ................................................. G01D 5/34
(52) U.S. Cl. ............................ 250/231.13; 250/231.16; 250/239; 250/231.14
(58) Field of Search ...................... 250/231.13, 231.16, 250/237 G, 231.14, 239, 551; 356/227.11, 616, 499; 257/678

(56) References Cited

U.S. PATENT DOCUMENTS 5,534,693 A * 7/1996 Kondo et al. ............ 250/237 G
5,640,008 A   6/1997 Bosch et al.
5,995,229 A   11/1999 Omi

FOREIGN PATENT DOCUMENTS

| DE | 198 43 155 A1 | 4/1999 |
| GB | 2 099 993 A | 12/1982 |
| GB | 2 229 813 A | 10/1990 |
| GB | 2 284 259 A | 5/1995 |
| JP | 11-101660 | 4/1999 |

* cited by examiner

Primary Examiner—Robert H. Kim
Assistant Examiner—Pamela R. Hobden
(74) Attorney, Agent, or Firm—Oliff & Berridge, PLC

(57) ABSTRACT

An optical encoder includes a reflective scale 1 and a sensor head 2. The sensor head 2 comprises a lead frame 21; and LED chip 22 mounted on the lead frame 21 and having a light-emitting surface directing upward for irradiating the scale 1; a photosensitive device chip 23 mounted on the lead frame 21 and having a photosensitive surface directing downward for receiving a reflected light from the scale 1; and a transparent resin body 24 molded for sealing the LED chip 22 and the photosensitive device chip 23 therein. A convex 25 is formed on a surface, which faces on the light-emitting surface of the LED chip 22, of the transparent resin body 24. A reflective film 26 is formed over the convex 25.

6 Claims, 5 Drawing Sheets

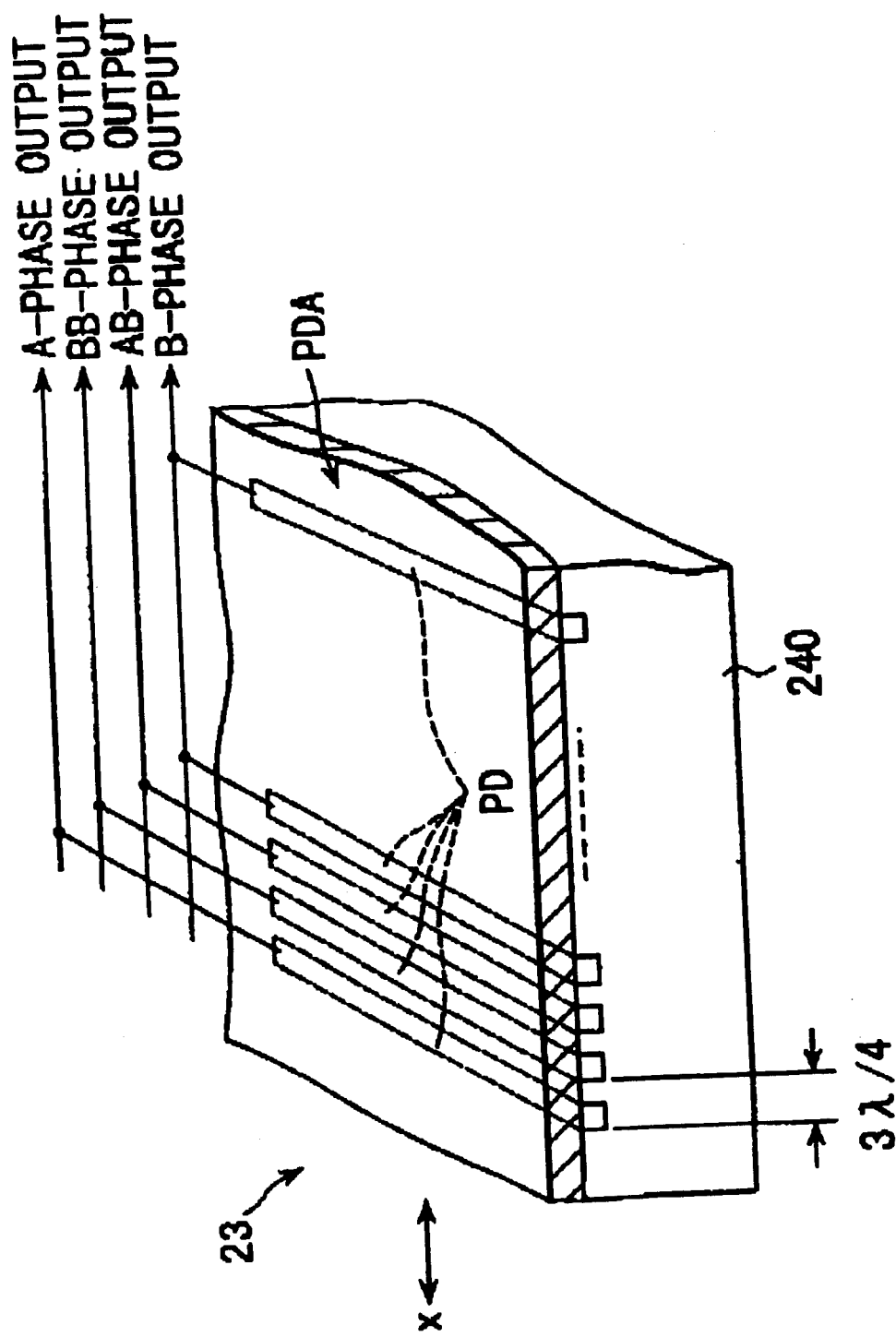

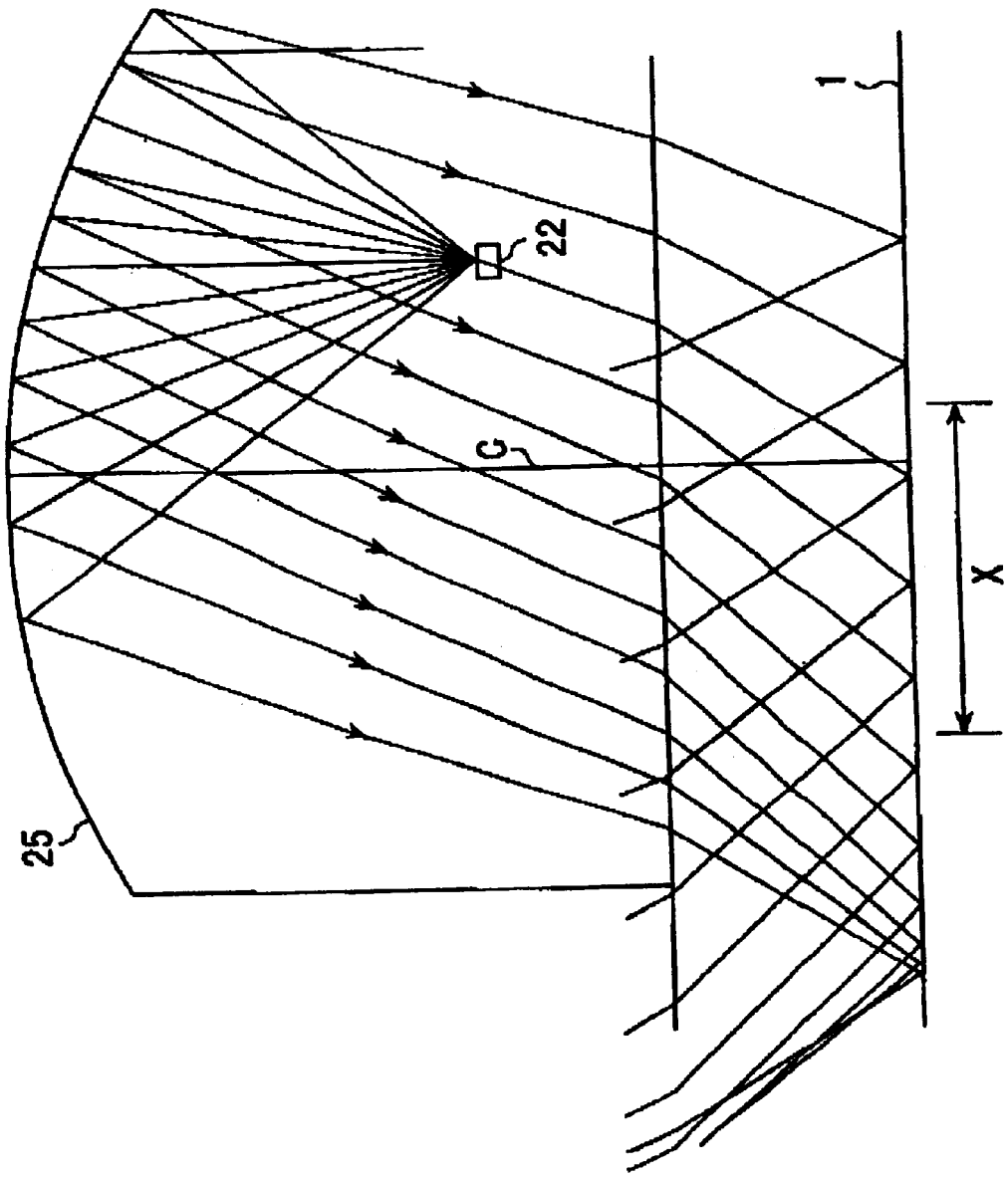

OPTICAL DISPLACEMENT DETECTING APPARATUS

BACKGROUND OF THE INVENTION

1. Field of the Invention

The present invention relates to an optical displacement detecting apparatus, and more particularly to a miniaturized displacement detecting apparatus constructed by fabricating a reflective scale and a sensor head that has a light-emitting device and photosensitive devices mounted thereon.

2. Description of the Related Art

It is well known that there are two types in optical encoders. One is a reflection type that detects a light reflected from scale gratings, and the other is a transmission type that detects a light transmitted through scale gratings. Among those, the reflection type encoder has an advantage in miniaturizing and thinning itself compared to the transmission type because a sensor head, which includes a light source and a photoreceptor, can be constructed only on one side of the scale. The sensor head of the reflective encoder, however, currently has a complicated structure that requires an appropriate frame to fabricate a substrate having photosensitive devices mounted thereon, a light-emitting device such as an LED, and a printed wire board for connecting these devices.

Therefore, the conventional reflection type encoder has a disadvantage in its complicated structure in order to produce a compact and thin encoder that can be integrated in a small X-Y table, for example. It also requires a lot of assembly man-hours and is difficult to achieve automated manufacturing and mass production.

The inventors have previously proposed a technology for realizing a miniaturized sensor head using a resin block (U.S. Pat. No. 5,995,229).

SUMMARY OF THE INVENTION

The present invention is directed to further improve the technology of the earlier application and accordingly has an object to provide an optical displacement detecting apparatus capable of further miniaturizing and thinning a sensor head.

The present invention is provide with an optical displacement detecting apparatus, which includes a reflective scale having scale gratings formed thereon with a certain pitch. It also includes a sensor head movably located relative to the reflective scale for emitting a light to the reflective scale and receiving reflected light from the reflective scale to generate a displacement signal. The sensor head comprises a lead frame. It also comprises an LED chip mounted on the lead frame at a and having a light-emitting surface for irradiating the reflective scale. The sensor head further comprises a photosensitive device chip mounted on the lead frame at a location apart from the LED chip and having a photosensitive surface for receiving a reflected light from the reflective scale. The photosensitive surface of the photosensitive device chip and the light-emitting surface of the LED chip are opposite in direction. The sensor head also comprises a transparent resin body molded for sealing the LED chip and the photosensitive device chip mounted on the lead frame therein. It further comprises a reflective film formed on the surface of the transparent resin body for reflecting the light emitted from the LED chip to irradiate the reflected scale.

According to the present invention, the sensor head is constructed by mounting the photosensitive device chip and the LED chip on the lead frame and integrally molding them with a transparent resin. This allows the sensor head to be miniaturized and thinned. In addition, power supplying to the light-emitting and photosensitive devices can be centralized in one position so that wiring spaces are possibly reduced. The photosensitive device chip and the LED chip are mounted on the lead frame so that their photosensitive surface and light-emitting surface are opposite in direction. In addition, the reflective film is formed on the surface, which faces on the LED chip, of the transparent resin body so as to reflect the light from the LED chip to irradiate the reflective scale. This allows the sensor head to gain a high sensitivity.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIG. 3 shows another arrangement example of a photosensitive device chip of the optical encoder.

FIG. 4 is a diagram illustrating a state of light-emission from the sensor head in the above embodiment.

DETAILED DESCRIPTION OF THE PREFERRED EMBODIMENTS

Figure 1A:
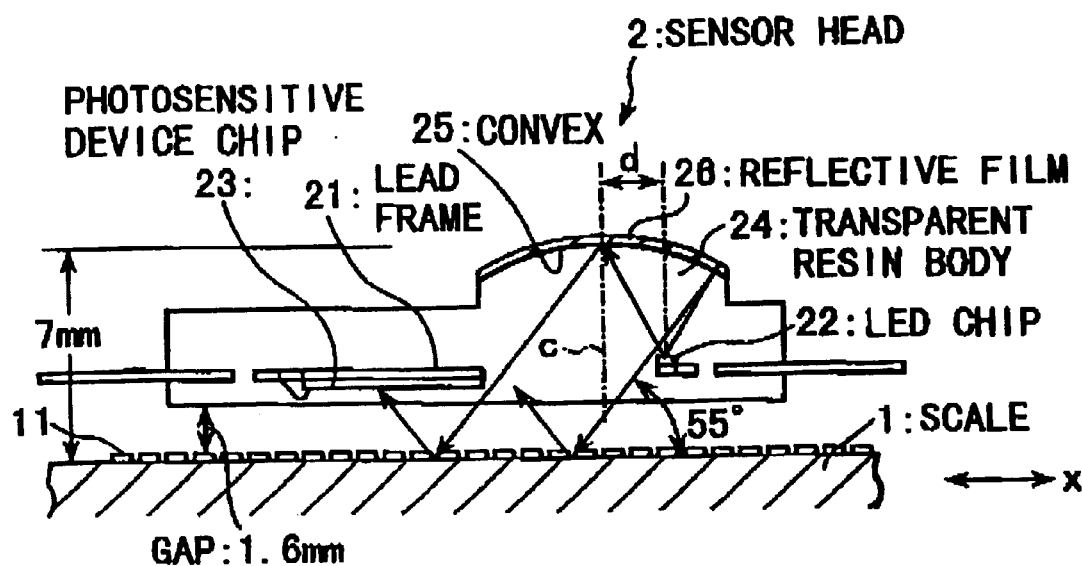
FIGS. 1A and 1B show an arrangement of an optical encoder according to an embodiment of the present invention.
Figure 1B:
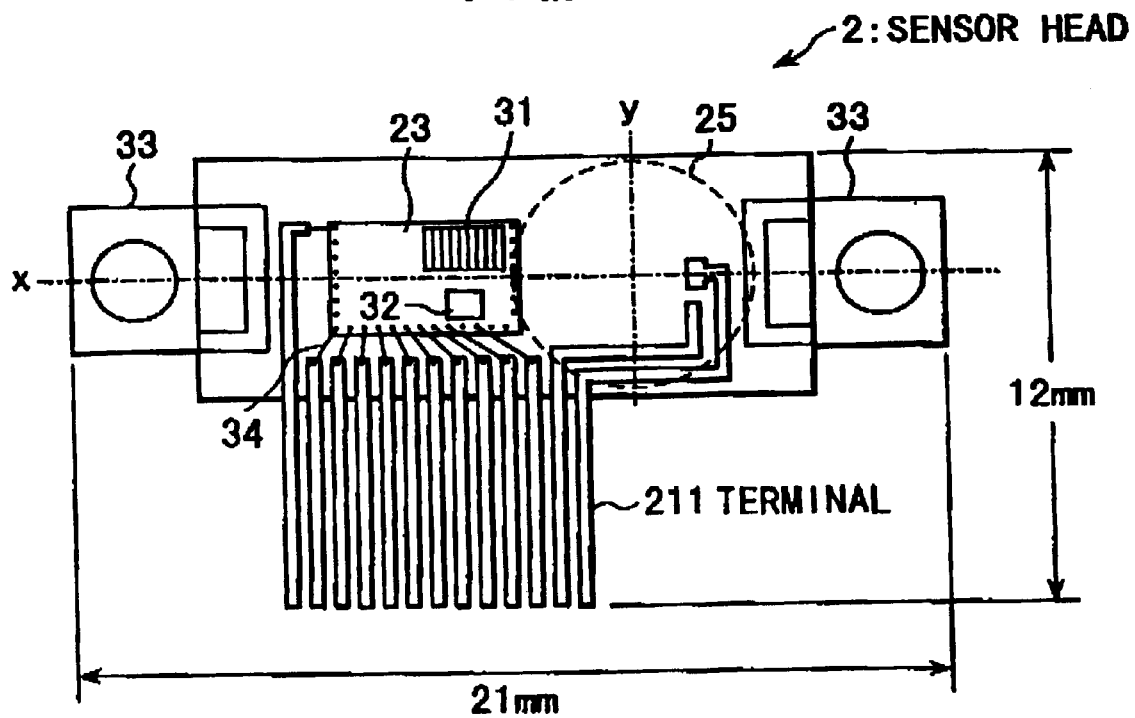

FIG. 1A is a cross sectional view showing an arrangement of an optical encoder according to an embodiment of the present invention and FIG. 1B is a rear view showing an arrangement of its sensor head viewed from the rear surface thereof (the rear surface facing on the scale). The optical encoder comprises a reflective scale 1 that has scale gratings 11 formed thereon with a predetermined pitch of $\lambda$ and arrayed in a measurement axis x. The optical encoder also comprises a sensor head 2 arranged opposing to the scale so that it can move along the measurement axis x relative to the scale. The sensor head 2 includes a transparent resin body 24 that is molded so as to contain a lead frame 21, an LED chip 22 and a photosensitive device chip 23 therein. The transparent resin body 24 is formed an substantially rectangular solid.

The LED chip 22 is mounted on the upper surface, that is not opposed to the scale 1, of the lead frame 21, directing its light-emitting surface upward. The photosensitive device chip 23 is mounted on the lower surface of the lead frame 21, directing its photosensitive surface downward. Power and signal terminals of the photosensitive device chip 23 and LED chip 22 are connected with leads 211 of the lead frame 21 via bonding wires 34. In this embodiment, a convex 25 is formed on a surface, which faces on the light-emitting surface of the LED chip 22, of the transparent resin body 24 at the same time of molding itself. The convex 25 is formed in such a manner that it has an optical axis C at a location slightly shifted from the LED chip 22 to the photosensitive device chip 23. Namely, the LED chip 22 is located at a position displaced a distance of d from the optical axis C. A reflective film 26 of Al, Ag or the like is formed over the convex 25. A section of the convex 25 and reflective film 26 forms a concave mirror for collecting diffused lights from the LED chip 22. Namely, the lights from the LED chip 22 are reflected at the convex 25 and converted into lights that irradiate the reflective scale 1 in an oblique direction.

In the example shown in FIG. 1A, the LED chip 22 and the photosensitive device chip 23 are arranged apart a predetermined distance from each other in a direction of the measurement axis x within the sensor head 2. The measurement axis x and an arrangement relationship between the LED chip 22 and the photosensitive device chip 23 of the sensor head 2 may be rotated 90° from the state of FIG. 1A. Namely, the scale 1 can be arranged in such a state that has the measurement axis x in a direction perpendicular to the drawing in FIG. 1A. In this case, the LED chip 22 and the photosensitive device chip 23 are arranged apart a predetermined distance from each other in the direction perpendicular to the measurement axis.

Index gratings 31 are formed on the photosensitive surface of the photosensitive device chip 23 as well as a pattern for detecting the point of origin. The index gratings 31 can be omitted, however, if the photosensitive device chip 23 comprises a photosensitive device array that also serves as index gratings.

Figure 2A:
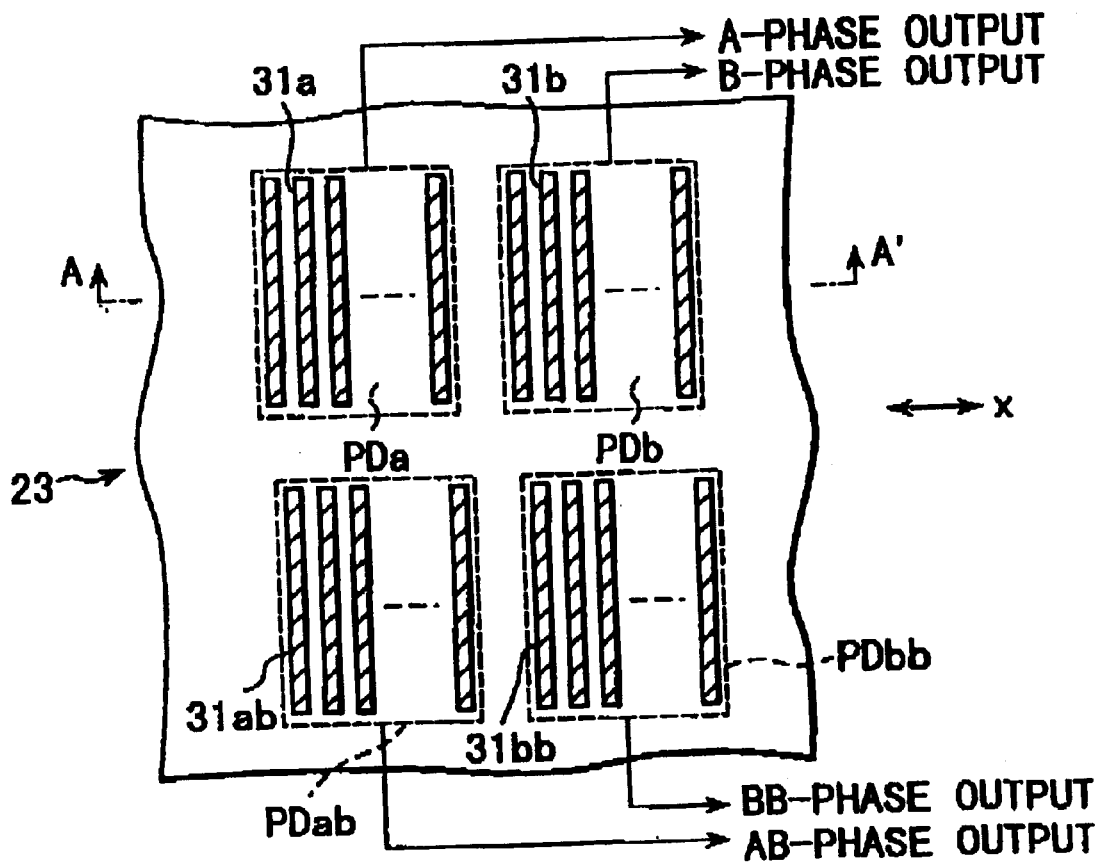
FIGS. 2A and 2B show an arrangement example of a photosensitive device chip of the optical encoder.
Figure 2B:
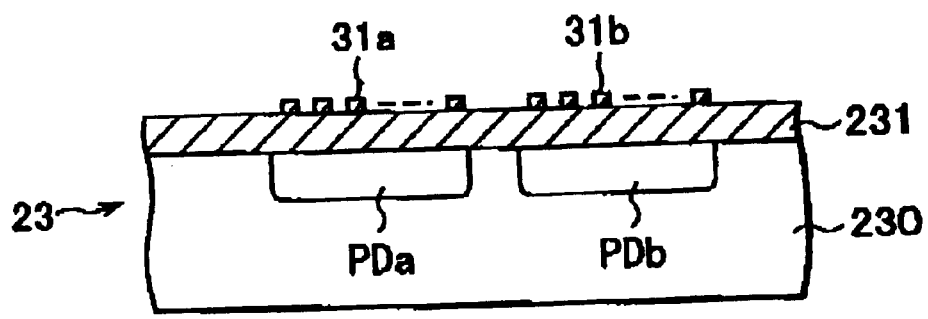

FIG. 2A is a plan view showing a principal part of an example of the photosensitive device chip 23 and FIG. 2B a cross sectional view of it along the A–A' line. Photodiodes PDs, PDb, PDab and PDbb are formed in a silicon substrate 230 for obtaining quadrature-phase displacement outputs of A-phase, B-phase, AB-phase a BB-phase. The silicon substrate 230 is covered with an insulator 231, on which quadrature-phase index gratings 31$a$, 31$b$, 31$ab$ and 31$bb$ are formed at positions respectively corresponding to the photodiodes PDa, PDb, PDab and PDbb. The index gratings 31$a$, 31$b$, 31$ab$ and 31$bb$ are formed successively shifted 90° from one another with the same grating pitch as the grating pitch $\lambda$ of the scale gratings 11 on the scale 1.

FIG. 3 shows an arrangement in the case of such a photosensitive device array that the photosensitive device chip 23 does not employ index gratings. Photodiodes PD are formed in a silicon substrate 240 so that they are arrayed with a pitch of 3$\lambda$/4 relative to the grating pitch $\lambda$ of the scale 1 to form a photosensitive device array PDA for obtaining quadrature-phase displacement outputs of A-phase, BB-phase, AB-phase and B-phase.

In this embodiment, provided at both edges of the sensor head 2 are metal latches 33 that are integrated with the transparent resin body 24.

The reflective film 26 is also formed over the convex 25 of the transparent resinous member 24 in the sensor head 2 as described above. An opaque film of an epoxy paint or the like is formed over the surfaces of the transparent resin body 24 other than the convex 25 and the surface facing on the scale 1. This makes it possible to prevent noises due to external lights from running into the displacement output signals.

The convex 25 is specifically determined in this embodiment as a spherical surface with a radius of curvature of R=6 mm. Alternately, the convex 25 may be determined as a paraboloid represented by $y^2=12x$. The LED chip 22 is determined to locate at a position that is displaced about d=1.5 mm from the position of R/2 on the optical axis C of the convex 25 (that is the focal position). This allows a principal part of diffused lights emitted from the LED chip 22 and reflected at the convex 25 to be converted into almost parallel lights that can be irradiated to the scale 1 in oblique direction.

The size of the sensor head 2 has a dimension of about 21 mm along the scale length containing the latches 33 as shown in FIG. 1B. Its width is about 12 mm, and a height is about 7 mm containing an about 1.6 mm air gap between the head and the scale 1.

FIG. 4 shows a result obtained by simulating a state of scale illumination in this embodiment. It is apparent from this result that the scale 1 can be irradiated almost uniformly within a region with a certain width X containing the optical axis C.

Figure 5:
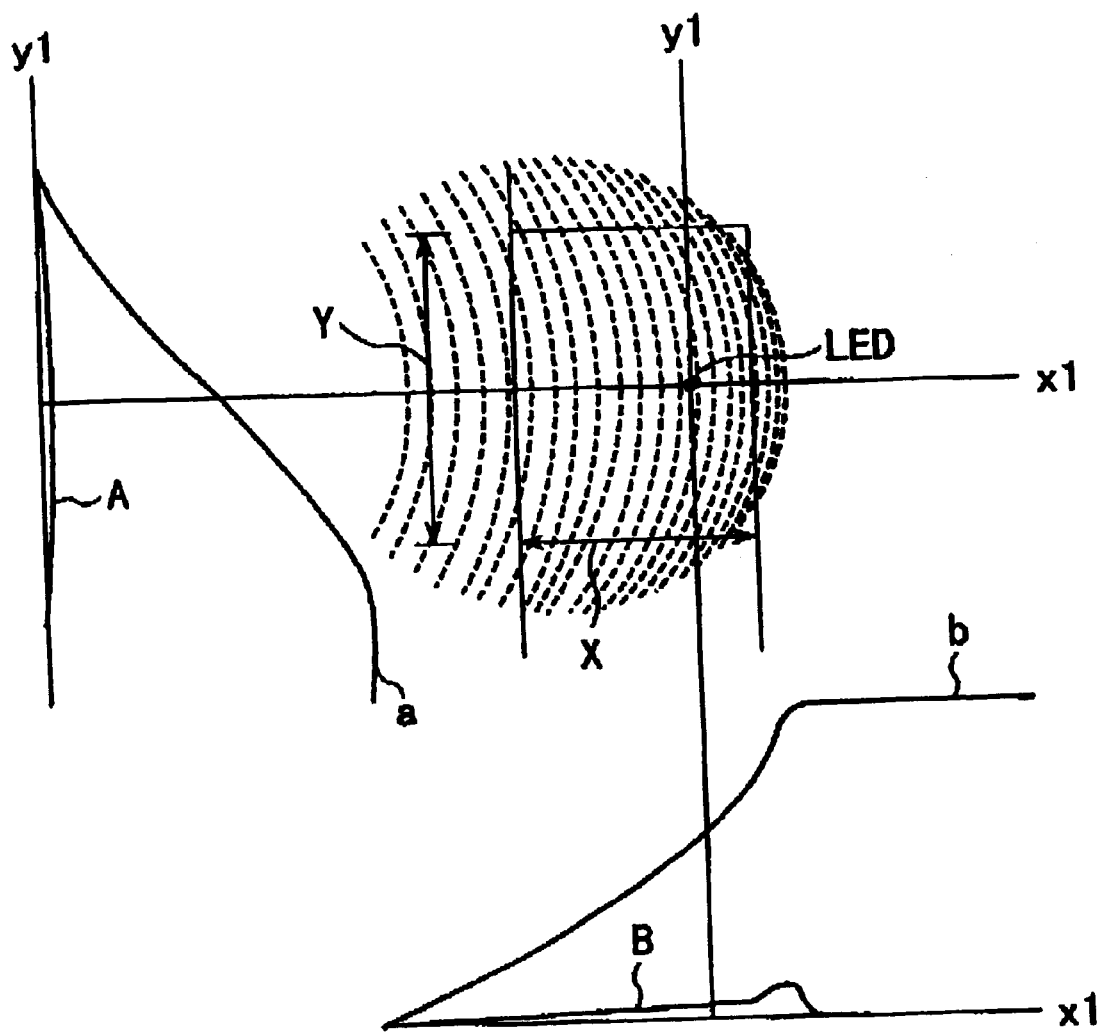
FIG. 5 is a diagram illustrating illuminance distributions on the scale irradiated from the sensor head in the above embodiment.

FIG. 5 shows a result obtained by simulating illuminance distributions over the plane on the scale 1. An x1–y1 plane in FIG. 5 is the plane on the scale 1 that is parallel to the x-y plane of the sensor head 2 shown in FIG. 1B. The figure depicts a dotted distribution of illuminance, and illuminance distributions A and B on the x1 and y1 axes. As obvious from the figure, the scale 1 can be irradiated uniformly within a region defined with the width X in the x1 direction and the width Y in the y1 direction. In FIG. 5, curves a and b show accumulated illuminance.

As described above, the convex 25 of the sensor head 2 acts to increase the illuminance in the irradiated region on the scale 1 by efficiently collecting the diffused lights from the LED chip 22. Though, the converter is not always required if the light intensity from the LED chip 22 is sufficiently high. In the case where the convex 25 is not formed, the diffused lights from the LED chip 22 are directly reflected at the reflective film 26 and irradiated to the scale 1, remaining the form of diffused lights.

As described above, the present invention can provide an extremely compact and thin sensor head that includes an LED chip and a photosensitive device chip both molded in a transparent resin. According to the present invention, bare chips are molded. Therefore, it is easy to achieve automatic manufacturing processes and mass production without complicated fabrication processes. In addition, an advanced reliability can be achieved because the positional relationship and optical axis of the LED and photosensitive device chips can be determined from the designs for the lead frame and the mold, and no later adjustment is required.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. An optical displacement detecting apparatus, including: a reflective scale having scale gratings formed thereon with a certain pitch; and a sensor head movably located relative to said reflective scale for emitting a light to said reflective scale and receiving a reflected light from said reflective scale to generate a displacement signal, wherein said sensor head comprises:

a lead frame;

an LED chip mounted on said lead frame and having a light-emitting surface for irradiating said reflective scale;

a photosensitive device chip mounted on said lead frame at a location apart from said LED chip and having a photosensitive surface for receiving a reflected light from said reflective scale, said photosensitive surface of said photosensitive device chip and said light-emitting surface of said LED chip being opposite in direction;

a transparent resin body molded for sealing said LED chip and said photosensitive device chip mounted on said lead frame therein; and a reflective film formed on the surface of said transparent resin body for reflecting a light emitted from said LED chip to irradiate said reflective scale, wherein:

said transparent resin body is formed of a substantially rectangular solid with a convex formed on a surface facing on said light-emitting surface of said LED chip so as to have an optical axis at a location shifted from said LED chip to said photosensitive device chip in said transparent resin body, whereby the light emitted from the LED chip is reflected at the convex to irradiate said reflective scale in an oblique direction.

2. The apparatus according to claim 1, wherein said convex is a spherical surface.

3. The apparatus according to claim 1, wherein said convex is a paraboloid.

4. The apparatus according to claim 1, wherein said transparent resin body further includes an opaque film formed on surfaces other than a surface opposing to said reflective scale and said convex.

5. The apparatus according to claim 1, wherein said photosensitive device chip includes:

a semiconductor substrate;

a plurality of photosensitive devices formed in said semiconductor substrate;

an insulator film covering over said plurality of photosensitive devices; and index gratings formed on said insulator film corresponding to each of said plurality of photosensitive devices with different phases relative to said scale gratings.

6. The apparatus according to claim 1, wherein said photosensitive device chip includes a photosensitive device array having a plurality of photosensitive devices arrayed with a pitch different from said scale gratings.

* * * * *